Nov. 15, 1966  W. C. DABROSKI  3,285,771
PERMANENT ATTACHMENT PRESSURE SENSITIVE ADHESIVE TAPE
Filed Dec. 21, 1962
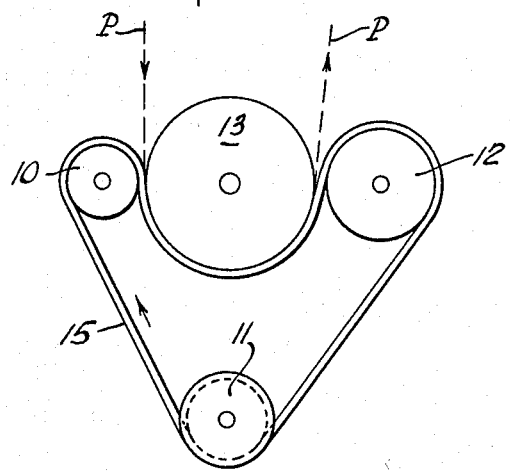
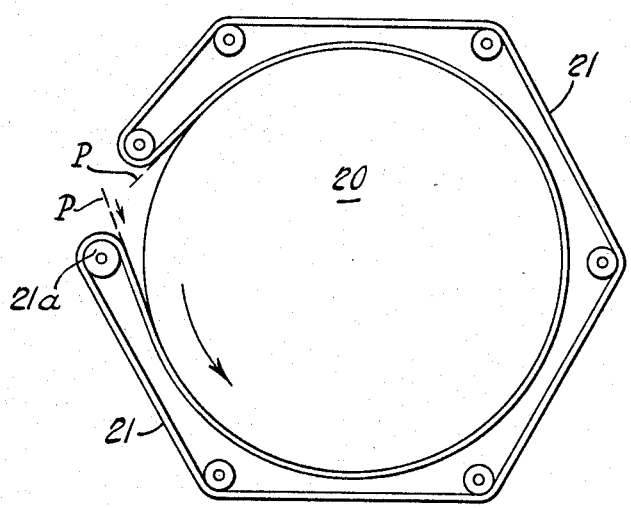
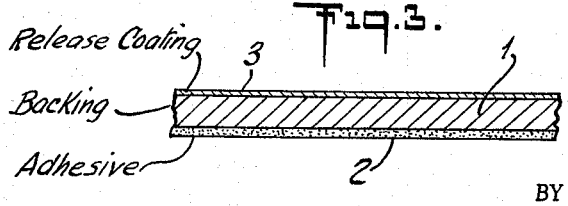
INVENTOR.
WINIFRED C. DABROSKI
BY
Charles A. Harris
ATTORNEY

United States Patent Office 3,285,771
Patented Nov. 15, 1966

3,285,771
PERMANENT ATTACHMENT PRESSURE
SENSITIVE ADHESIVE TAPE
Winifred C. Dabroski, East Brunswick, N.J., assignor to Johnson & Johnson, a corporation of New Jersey
Filed Dec. 21, 1962, Ser. No. 246,592
2 Claims. (Cl. 117—68.5)

This application is a continuation-in-part of my co-pending application, Serial No. 155,524, filed November 9, 1961, and now abandoned, which in turn is a continuation of my application Serial No. 792,518, filed February 11, 1959, and now abandoned.

This invention relates to improved pressure-sensitive adhesive tapes. More particularly, this invention pertains to improved paper-backed, normally tacky and pressure-sensitive adhesive tapes which are of the permanent attachment type. The tapes of this invention have a wide variety of commercial applications such as low stick label stock; attaching photographic films to paper liner, and for packaging purposes.

Paper-backed, normally tacky and pressure-sensitive adhesive tapes are well known. In order that a paper-backed, pressure-sensitive adhesive tape be practical, it has been found necessary to treat the paper by various methods in order to enable the roll of tape to unroll without splitting or delaminating the paper web by means of the forces set up by adhesion of the adjacent plies of the tape in roll form. The most common method of unifying or strengthening the paper against splitting comprises the incorporation into the raw paper of extensible materials of a more or less rubbery nature termed "impregnants." It should be understood that the term "impregnant" as used herein pertaining to unifying paper webs means those materials conventionally incorporated in paper webs for improving their delamination resistance, but does not include conventional paper making additives sometimes incorporated in paper webs for improving their wet strength and the like. While incorporation of unifying impregnants such, for example, as a rubbery polymer or mixtures of polymers, will usually result in good unification, such a treatment adds considerably to the cost of the tape. In many instances wherein the paper-backed tape is to be used in temporary or non-permanent applications such, for example, as in certain masking applications, impregnation of the web with an impregnant is often essential to impart to the tape the required delamination resistance. When the paper-backed tape is used in permanent applications, however, a lower degree of delamination resistance is required, the delamination resistance having to be only that required to enable the roll of tape to be unrolled without splitting or delaminating the paper. Furthermore, in many applications where the permanent type tape is used it is highly desirable that the tape be "tamperproof," i.e., that it can not be removed from a smooth surface to which it is attached without delamination or tearing of the backing.

Objects and advantages of the invention will be set forth in part hereinafter and in part will be obvious herefrom, or may be learned by practice with the invention, the same being realized and attained by means of the steps, methods, compositions, combinations and improvements pointed out in the appended claims.

The invention consists in the novel steps, methods, compositions, combinations and improvements herein shown and described.

Accordingly, it is an object of this invention to provide an improved paper-backed, normally tacky and pressure-sensitive permanent adhesive tape which is tamperproof and yet may be unrolled easily without splitting or delamination. A further object of this invention is to provide an improved paper-backed, normally tacky and pressure-sensitive permanent adhesive tape which is tamperproof and possesses improved delamination resistance, and which can be manufactured cheaply without the use of unifying impregnant compositions. A still further object of this invention is to provide a novel method for manufacturing an improved paper-backed, normally tacky and pressure-sensitive adhesive tape having the qualities set forth in the foregoing objects.

According to this invention, the foregoing objects are realized by applying an adhesive layer to the underside of a non-unified paper backing of this invention and a release coating to the topside of the backing, when the characteristics of the backing, the adhesive layer and the release coating are such that the cohesive strength of the backing is (a) greater than the adhesion of the adhesive layer to the release coating and (b) less than the adhesion of the adhesive layer to a smooth surface, such as smooth glass or steel, and to the underside of the backing, itself.

More specifically, it has been found that these objects may be attained by coating on one side of a non-unified paper backing treated in a manner set forth in detail hereinafter so as to have a delamination resistance of at least 15 oz./in. width and not above about 30 oz./in. width, preferably, 20 to 30 oz./in. width, a normally tacky and pressure-sensitive adhesive layer giving an adhesion to steel of at least about 10 oz./in. width, and applying, on the side of the backing opposite the adhesive side, a coating or layer of a composition which possesses release properties with respect to the normally tacky and pressure-sensitive adhesive whereby the unwind adhesion, or the adhesion to backing of the resulting tape when in roll form, is not greater than 20 oz./in. width at an unwound speed of 150 ft./min. In determining delamination resistance a strip about 10 inches long, normally cut in the machine direction of the paper, is placed between two strips of Bondex BT 7, a thermoplastic rug bonding tape manufactured by Permacel, a division of Johnson & Johnson. The sandwich is put into a press and bonded by applying a pressure of 20 pounds for 30 seconds at 275° F. The strip of Bondex and the test specimen extend beyond one edge of the side of the press. The bonded laminate is then cut into strips one inch wide. The ends of the Bondex strips are pulled apart by hand until paper splitting is started. (Once this initial splitting is started, it will almost always continue through the length of the test sample.) The ends of the Bondex strips are then placed in the jaws of a tensile machine, and the force required to continue the paper splitting is measured. The rate of jaw separation is 10 inches per minute. An autographic recording device on the tensile machine is highly desirable in order to obtain the best average of the force required to continue the splitting over the length of the sample. Adhesion to steel is measured by fixing the adhesive side of a length of tape to a polished stainless steel surface and measuring the force required to peel the tape from the steel surface at 1 ft./min. when the tape is pulled back over itself at 180° to the portion adhered to the surface. As is well known to those in the tape field, adhesion to backing, when expressed in oz./in. width per 150 feet, is the force necessary to unwind a particular tape from a roll at a speed of 150 ft./min.; said tape being supported on a freely rotating mandrel.

It is important to note that the numerical values given for delamination resistance, adhesion to steel and unwind adhesion are not comparable even though each is measured in ounces per inch of width. These values are determined by different tests conducted under different conditions, as indicated above, and these tests have become standard in the industry for measuring these values.

Also, as indicated above, the paper sheet used in accordance with the instant invention is a non-unified sheet which has a delamination resistance of at least about 15 oz./in. width and not above about 30 oz./in. width. An example of a paper sheet having the aforementioned properties is a paper web on whose surfaces have been simultaneously applied a compressive force in a direction substantially parallel to the face surfaces of said web, and a pressure perpendicular to said face surfaces. The web compressed in the aforementioned manner has compressively distorted fibers between the face surfaces of said web, said fibers being compressed in a direction substantially parallel to the web faces. In applying the aforementioned compressive force to said web, the web is subjected to compression in the machine and/or cross machine direction resulting in a substantial decrease in the length and/or width of the paper, while maintaining the web under substantial pressure perpendicular to its surface to maintain high sheet density.

Mechanisms and procedures employed for obtaining the aforedescribed compressed paper web used in accordance with this invention are described in prior patents and prior copending applications. For example, U.S. Patent 2,624,245 and Australian Patent 160,684 disclose apparatus and methods whereby a paper web may be compressed longitudinally in a continuous manner.

In the drawings:

FIG. 1 is a diagrammatic side elevation of simple apparatus useful in performing the compacting step or steps employed in the invention;

FIG. 2 is a diagrammatic side elevation of apparatus which may also be employed in conjunction with the apparatus of FIG. 1; and FIG. 3 is a schematic cross section of an adhesive tape utilizing, as the backing, a paper sheet treated in accordance with this invention.

The apparatus of FIG. 1 comprises rolls 10, 11, 12 and a heated driven roll, or drum, 13 and a thick belt 15 with a contractible surface layer preferably of rubber of durometer hardness sufficient to prevent creping of the paper web. This belt may be formed of natural rubber or rubber substitutes, a relatively inextensible layer faced with a readily extensible and contractible surface layer of any suitable material of smooth contractible surface of sufficient hardness and extensibility, rolls 10 and 13 being adjustably movable toward or from each other so as to properly nip the belt 15 under pressure between them where the belt passes from roll 10 to the drum 13, and roll 12 being spaced away from the drum 13 sufficiently to give the belt a short straight run from the drum 13 to roll 12. As the belt passes from roll 10 to the drum 13, the outer surface of the rubber belt which is convexly curved on roll 10 becomes concavely curved on the drum 13 and accordingly shortens. A moistened paper web P, fed in between the belt and the drum 13 where this shortening of the belt surface is taking place, is forced into such frictional contact with the contracting surface of the belt that the belt surface tends to compact, or compress, the web, parallel with the surfaces of the web. While the apparatus shown is intended to compact the web in the machine direction of the web, the web may be compacted laterally, i.e., transversely of the direction in which it was made on the paper machine, by turning short lengths sidewise and passing them individually through the apparatus. The drum 13 must be accurately machine ground and finished to a true cylinder of smooth periphery. It is heated not only to cause a partial drying of the web but also to lower the coefficient of friction between the drum and the moist web while at the same time heating the contained water and thus cause a softening and increased flexibility of the fibers. The resulting loss of water in the web makes room between the fibers for further compaction of the web as may be desired. The coefficient of friction between the wet web and the heated drum 13 is most effectively reduced at drum temperatures, sufficient to generate moisture vapor, i.e., under normal atmospheric conditions about 212° F. The coefficient of friction of the surface of the drum 13 is relatively low as compared to the coefficient of friction of the web-containing surface of the belt 15, so that under the influence of the contracting belt surface the paper web P tends to partake of such contraction of the belt surface and slide with relation to the roll surface. During the lateral or longitudinal compaction of the paper, the tension in the rubber belt is maintained sufficiently high so that with the selected hardness of the belt surface the pressure between the rubber belt 15 and the drum 13 tends to prevent the paper from creping and keep the surfaces of the paper substantially flat and parallel, so that as the web is compressively shortened, individual fibers of the paper which lie generally crosswise or lengthwise of the web or in the direction of shortening are compressively distorted crosswise or lengthwise within the body of the web. Rubber is preferred as the material for the contracting surface, such as that of the belt 15, because of its ability to withstand strong tension and heavy pressure transverse to its surface, thus enabling a relatively large and effective contraction of this surface to take place without allowing the paper to crepe in response to such contraction. Rubber is also preferred for its continuously smooth surface and for its ability to grip the paper frictionally to the extent of compacting the paper laterally or longitudinally in the presence of the heavy pressure exerted between the belt and the drum 13 for prevention of creping. In the apparatus as shown, it is preferable that the rubber is reinforced by comparatively inextensible material such as heavy canvas or layers of strong cords so that the necessary high tension in the belt may be maintained and also so that the surface of the belt will expand and contract uniformly while passing over the roller 10 and the heated driving drum 13.

The apparatus of FIG. 2 was employed in conjunction with the apparatus of FIG. 1 principally to facilitate drying of the paper web. As shown in FIG. 2, a moisture-permeable belt 21 passes over an intake roll 21a and thence onto and around a heated drum 20, holding the paper web against the drum during drying.

FIG. 3 illustrates a tape according to this invention which comprises a paper backing 1 formed by compaction as described above and coated on its bottom side with a layer of pressure-sensitive adhesive 2 and on its topside with a release coating 3.

As indicated heretofore, in forming the adhesive tapes in accordance with this invention, one side of a laterally and/or longitudinally compressed paper web is coated with a normally tacky and pressure-sensitive adhesive, and the side of the paper web opposite the adhesive side, is coated with an agent having good release qualities with respect to the normally tacky and pressure-sensitive adhesive. Any conventional normally tacky and pressure-sensitive adhesive may be used. As indicated earlier, however, the adhesive used and the release agent coated on the opposite side of the backing are of such nature that the adhesion to backing is not greater than 20 oz./in. width at an unwind speed of 150 ft./min. In general, the adhesive is applied at a coating weight in the range from about 1 to 3 oz./sq. yd., and preferably, from about 1.5 to 2.0 oz./sq. yd. Normally tacky and pressure-sensitive adhesives useful in this invention generally comprise an elastomeric polymer, a compatible tackifier in an amount to impart normally tacky and pressure-sensitive properties to the mass, and conventional adhesive additives. In some instances, a tackifier is not required when the elastomeric polymer is copolymerized or interpolymerized to have the desired degree of adhesiveness.

Examples of elastomers useful in forming normally tacky and pressure-sensitive adhesive masses are diene polymers such, for example, as isoprene polymer (natural rubber, synthetic polyisoprene, etc.); as copolymers of a conjugated diene (butadiene) and styrene or styrene homologues, said copolymers formed from a monomer mixture containing at least 40% of the diene and 10% styrene. Conventional tackifiers which may be used in forming a normally tacky and pressure-sensitive adhesive are rosin, hydrogenated rosin, dehydrogenated rosin, the glycols and the glycerides of any of these resinous materials, polyterpenes, coumarone idene resins, polyalkyl styrenes, oil-soluble aldehyde resins, or any other desired tackifier in any of the proportions that are so well known in the art. The adhesive mass may be free of an inert filler or may contain inert filler such as zinc-oxide, magnesium carbonate, calcium carbonate, lead oxide, clay, titanium dioxide, aluminum, hydrated alumina, pulverized glass, silica or any of the other conventional fillers for normally tacky and pressure-sensitive adhesives. Other ingredients such as anti-oxidants or heat stabilizers, dyes or pigments may be present or absent depending upon the particular desired use for the adhesive sheet. Typical normally tacky and pressure-sensitive adhesive masses are disclosed in Johnson & Johnson's British Patent No. 611,211, issued October 1948, in Nelson's United States Patent No. 2,415,-901 issued February 18, 1949, in Priepke's United States Patent No. 2,405,926, issued August 1, 1946, in Buckley's United States Patent No. 2,397,774, issued April 2, 1946, and in many other patents.

Typical examples of normally tacky and pressure-sensitive adhesives useful in accordance with this invention are:

ADHESIVE A

| Ingredient: | Parts by wt. |
|---|---|
| Crude rubber | 58.6 |
| Butadiene-styrene copolymer (71:29 monomer ratio) | 8.5 |
| Aluminum hydrate | 33.5 |
| Polyterpene resin (M.P. 115° C.) | 53.5 |
| Toluene diisocyanate | 1.0 |
| Amberol M–88 (non-heat hardening phenol-formaldehyde resin mfg. by Rohm & Haas) | 6.8 |
| Santovar A | 1.0 |
| Ionol | 1.5 |

ADHESIVE B

| Crude Rubber | 71.4 |
|---|---|
| Al hydrate | 33.1 |
| Polyterpene (M.P. 115° C.) | 51.0 |
| Amberol ST137–X (non-heat hardening alkyl-phenol-formaldehyde resin | 8.5 |
| Versene | 3.9 |
| Lecithin | 4.1 |

ADHESIVE C

| Smoked sheet rubber #1 | 100.0 |
|---|---|
| Polyterpene resin (M.P. 115° C.) | 60.0 |
| Tertiary amyl hydroquinone | 0.7 |
| Ethylene diamine tetracetic acid (Na salt) | 0.7 |
| Dibutyl para cresol | 0.7 |

ADHESIVE D

| Ingredient: | Parts by wt. |
|---|---|
| Smoked sheet rubber | 14.5 |
| Butadiene-styrene copolymer (71:29 monomer ratio) | 35.8 |
| Pure gum reclaimed rubber | 49.7 |
| Polyterpene resin (M.P. 70° C.) | 65.8 |
| Zinc oxide | 57.7 |
| Ditertiary amyl hydroquinone | 1.0 |
| Triphenyl phosphite | 9.0 |
| Dibutyl para cresol | 1.0 |
| Lecithin | 1.0 |
| Lanolin | 7.3 |

ADHESIVE E

| Pale crepe rubber | 100.0 |
|---|---|
| Titanium dioxide filler | 20.0 |
| Aluminum hydrate filler | 27.5 |
| Polyterpene resin (M.P. 115° C.) | 71.6 |
| Tertiary octyl phenol formaldehyde resin (non-reactive) M.P. 85° C. | 11.7 |
| Tertiary amyl hydroquinone | 2.5 |
| Triphenyl phosphite | 5.0 |

ADHESIVE F

| Acrylon BA–12 (88 butylacrylate: 12 acrylonitrile) | 100.0 |
|---|---|
| Tertiary octyl phenol formaldehyde (M.P. 85° C.) (heat reactive) | 12.5 |
| Amberol M–88 (modified phenol formaldehyde-non reactive) M.P. 165° | 10.0 |
| Santolite MHP (amyl sulfonamide-formaldehyde resin) M.P. 65° C. | 97.6 |
| Atomite (ground $CACO_3$ filler) | 25.0 |

ADHESIVE G

| Pale crepe rubber | 100 |
|---|---|
| Polyterpene resin (M.P. 115° C.) | 100 |
| Polyterpene resin (M.P. 40° C.) | 10 |
| Urea-formaldehyde heat reactive resin (60% solids) | 20 |
| 2,5 ditertiary amyl hydroquinone | 2 |
| Butyl Zimate | 2 |
| Paratoluene sulfonic acid dissolved in isopropyl alcohol | 6 |
| Toluene | 920 |

ADHESIVE H

| Crude rubber | 50 |
|---|---|
| GRS 1022 | 50 |
| "Amberol ST137" (heat reactive phenolic resin) | 20 |
| Zinc oxide | 60 |
| Diethylene glycol ester of dehydroabietic acid | 110 |
| Antioxidants | 2 |

An indicated heretofore, the side of the tape backing opposite the adhesive coated side is coated with an agent having good release properties with respect to the normally tacky and pressure-sensitive adhesive. Any suitable release agent may be used for such purpose. As indicated earlier, however, the particular adhesive and release agent used must be of such nature that the adhesion to backing is not greater than 20 oz./in. width at an unwind speed of 150 ft./min. In general, the release agent is applied at a coating weight of 0.5 oz./sq. yd. down to a minimum coating which will give a continuous coating. The preferred coating weight is in the range of about 0.15 to 0.3 oz./sq. yd.

Examples of suitable release agent compositions useful in accordance with this invention are as given below, the parts shown being by weight.

RELEASE AGENT A

| Ingredient: | Parts by wt. |
|---|---|
| "Cyped" (an ethyl acrylate-acrylonitrate copolymer, 65:35 monomer ratio, mfg. by American Cyanamid Corp.) | 100 |
| "Durez 14798" (a water soluble, heat-reactive phenol formaldehyde resin mfg. by Durez Plastics Co.) | 10 |

RELEASE AGENT B

| | |
|---|---|
| Nitrocellulose | 100 |
| Stearyl maleate-vinyl acetate copolymer (50:50 monomer ratio) | 7 |

RELEASE AGENT C

| | |
|---|---|
| Vinyl chloride—vinyl acetate copolymer (88:12 monomer ratio) | 100 |
| Sorbitan monostearyl—toluene diisocyanate reaction product (80:20 reactant ratio) | 7 |

RELEASE AGENT D

An alkyd resin manufactured by the Pittsburgh Plate Glass Company and sold under the trade name "Pittsburgh 2400."

RELEASE AGENT E

| | |
|---|---|
| Ubitol #7,001 (acrylic acid-ethyl acrylate emulsion at 15% solids) | 275 |
| Sodium lauryl sulphate (12% sol. in H$_2$O) | 58 |
| Durez 14,798 (heat reactive phenol-formaldehyde resin) at 50% solids | 8 |
| Titanium dioxide dispersion in H$_2$O | 27 |
| Water | 73 |

The following examples are illustrative of the normally tacky and pressure-sensitive adhesive tapes formed in accordance with the invention. Unless otherwise indicated, the parts given are by weights. It is to be appreciated that the compositions and manufacturing conditions set forth are exemplary and the invention should not be considered limited thereto.

Example I

A relatively dense kraft paper of 30 lbs. raw weight (24 x 36 x 480) which has been compressed longitudinally (12%) so as to have a delamination resistance of 30 oz./in. width is coated on one side with release agent A at a coating weight of 0.3 oz./sq. yd. and on the opposite side with adhesive A at a coating weight of 1.25 oz./sq. yd. to give an adhesion to steel of at least about 10 oz./in. width. The resulting tape has an unwind adhesion of 10 oz./in. width at unwind speed of 150 ft./min.

Example II

A kraft paper of 30 lbs. raw weight (24 x 36 x 480) containing a small amount of wet strength agent and which has been compressed longitudinally (10%) so as to have a delamination resistance of 15 oz./in. width is coated on one side with release agent D at a coating weight of 0.25 oz./sq. yd. and on the other side with adhesive B at a coating weight of 1.1 oz./sq. yd. to give an adhesion to steel of at least about 10 oz/in. width. The resulting tape has an unwind adhesion of 11 oz./in. width at an unwind speed of 150'/min.

The following table summarizes additional examples of tapes formed in accordance with the instant invention. In each instance the backing is the compressed kraft paper used in accordance with Example I having a delamination resistance of 30 oz./in. width. Moreover, in each instance the release agent is coated at a coating weight of 0.25 oz./sq. yd. Also, in each case, adhesion to steel is at least about 10 oz./in. width.

| Example | Release Composition | Adhesive Compositions |
|---|---|---|
| III | Release Agent B | Adhes. Comp. C. |
| IV | Release Agent D | Adhes. Comp. D. |
| V | Release Agent C | Adhes. Comp. E. |
| VI | Release Agent D | Adhes. Comp. F. |

Example VII

A creped kraft starting paper is provided having a basis weight of 33 lb. (24 x 36 x 480). This paper is coated on one side with a silicone release material sold by Daubert Chemical Company under the designation 1-33KC-11. The paper is compacted longitudinally about 16% as described hereinbefore to give a delamination resistance of 15 oz./in width. The side of the compacted paper opposite to the release coating is next coated with 1.9 oz./sq. yd. of adhesive G and the adhesive is dried by conventional means to give an adhesion to steel of 24 oz./in. width. The resulting tape has an unwind adhesion of 13 oz./in. width at an unwind speed of 150'/min.

Example VIII

A kraft bag stock having a basis weight of 35 lb. (24 x 46 x 480) which is compacted longitudinally as described hereinbefore so as to have a delamination resistance of 18 oz./in. width, is coated on one side with release agent E at a coating weight of 0.25 oz./sq. yd. and dried, and on the opposite side with adhesive H at a coating weight of 1.0 oz./sq. yd., dried and cured, to give an adhesion to steel of 12 oz./in. width. The resulting tape has an unwind adhesion of 18 oz./in. width at an unwind speed of 150'/min.

Example IX

The compacted starting paper of Example VIII is coated on one side with the same release agent at the same coating weight to provide a coated backing having the same delamination resistance, i.e., 18 oz./in. width. This backing is coated on the other side with adhesive A at a coating weight of 1.0 oz./sq. yd. and dried to give an adhesion to steel of 14 oz./in. width. The resulting tape has an unwind adhesion of 17 oz./in. width at an unwind speed of 150'/min.

The invention in its broader aspects is not limited to the specific steps, methods, combinations and improvements described but departures may be made therefrom within the scope of the accompanying claims without departing from the principles of the invention and without sacrificing its chief advantages.

The invention claim is:

1. A paper-backed, normally tacky and pressure-sensitive adhesive tape having improved delamination resistance, and capable of being unwound in roll form without splitting, consisting essentially of a non-unified paper sheet having a delamination resistance of at least 15 oz./in. width and not above about 30 oz./in. width and having on one side a coating of a normally tacky and pressure-sensitive adhesive giving an adhesion to steel of at least about 10 oz./in. width, and having on the side opposite the adhesive side, a coating of a release agent which possesses release properties with respect to said adhesive whereby said tape in roll form has an unwind adhesion less than 20 oz./in. width at an unwind speed of 150'/min., said non-unified paper sheet being formed from a cellulosic fibrous paper web having an elongated web body, and two opposed web faces, by (1) subjecting said paper web, while plasticized with moisture and heated to a temperature sufficient to generate moisture vapor, simultaneously to (a) sufficient confining pressure, acting perpendicularly with respect to said web faces, to prevent substantial crinkling of the web body, and (b) sufficient compacting force, acting longitudinally with respect to the length of said web and in a direction parallel to said web faces (i) to cause the web fibers to be longitudinally distorted and forced closer together in changed orientation lengthwise within the web body and (ii) to cause the web body thereby to contract in length by a substantial amount and (2) drying said compacted web, to set the distorted fibers in their changed orientation, the cohesive strength of said compacted backing being
(a) greater than the adhesion of the adhesive layer to the release coating, and
(b) less than the adhesion of the adhesive layer to a smooth steel surface and to the surface of the compacted backing on which the adhesive is coated.

2. A pressure-sensitive adhesive tape according to claim 1, wherein the release coating is applied to the backing prior to compaction of the backing.

References Cited by the Examiner

UNITED STATES PATENTS

| | | | |
|---|---|---|---|
| 1,814,132 | 7/1931 | Drew | 117—80 X |
| 2,032,386 | 3/1936 | Wood | 117—1 X |
| 2,624,245 | 1/1953 | Cluett | 162—206 |
| 2,725,981 | 12/1955 | Abere et al. | 117—68.5 X |
| 2,822,290 | 2/1958 | Webber | 117—68.5 |
| 3,055,496 | 9/1962 | Dunlap | 117—68.5 X |

WILLIAM D. MARTIN, *Primary Examiner.*

W. D. HERRICK, *Assistant Examiner.*